Patented Jan. 29, 1935

1,989,241

UNITED STATES PATENT OFFICE 1,989,241

CREAMING OF LATEX

John McGavack, Leonia, N. J., assignor, by mesne assignments, to United States Rubber Company, New York, N. Y., a corporation of New Jersey No Drawing. Application June 24, 1933, Serial No. 677,466

15 Claims. (Cl. 18—50)

This invention relates to the creaming of latex, and more particularly to methods for increasing the rate of creaming of latex in chemical creaming processes.

It has been known for a considerable period of time that if certain organic colloidal materials, such as Karaya gum, glue, ammonium alginate, Irish moss, pectin bodies, and the like, are added to latex in proper amounts, separation of the latex into two liquid layers may be effected. In this way it has been possible to concentrate and purify latex. In such methods of creaming latex, creaming agent is added to the latex and mixed therewith by relatively slow stirring,—indeed it is usual to cause as little agitation as possible when adding creaming agents to latex, in order to avoid frothing and aeration of the latex,—and the latex is then allowed to stand until separation into rubber-rich and serum portions takes place by gravity. After addition of the creaming agent there is a considerable induction period, or a period of time during which substantially no separation into rubber-rich and serum portions occurs, and after the separation has begun a relatively long period elapses before the desired maximum concentration of rubber throughout the rubber-rich portion is obtained. It is also known that while such processes are applicable to unvulcanized latices, which may be preserved as is common practice with alkali material, the process of creaming with chemical creaming agents has not been successful when applied to vulcanized latices, unless a centrifugal separation has been utilized to assist in the separation into rubber-rich and serum portions. It is known also to increase the rate of separation of the rubber-rich and serum portions upon the addition of creaming agent, by heating the latex, as by indirect heating or by passing steam directly into the same, to temperatures of up to 90° C. or above.

The present invention relates to a new method of increasing the rate of chemical creaming of latex wherein known creaming agents are employed. The present process further provides a satisfactory method for creaming vulcanized latex as well as unvulcanized latex, without the necessity for a cumbersome centrifuging operation having a low output, or for a prior admixture with such vulcanized latex of a large proportion of unvulcanized latex to assist in the separation of the rubber-rich and serum portions, as has been proposed. The invention further provides a method for obtaining more highly concentrated creams than have been obtainable by known chemical creaming methods.

In carrying out the present invention, the usual processes of creaming latex with the aid of creaming agents are modified by subjecting the latex to violent shearing stress for a brief period of time, whereby to effect a severe mechanical agitation of the latex greatly in excess of that necessary to thoroughly mix the creaming agent with the latex. The required shearing stress may be applied to the latex by such methods as are typified by agitating the latex by means of a high-speed stirrer, for example, a stirrer having a rotor rotating at a speed of from 2000 to 15000 R. P. M.; by passing the latex between two surfaces having a high velocity with respect to each other, as exemplified in a high-speed colloid mill; or by passing the latex continuously and rapidly through a centrifuge in such manner that no separation of the latex into two liquid portions occurs. Such mechanical agitation may take place either a short time prior to the addition of the creaming agent, or after the addition of the creaming agent, or concurrently therewith. In general, the more severe the agitation, the more pronounced is the acceleration of the creaming process and the shorter is the period of agitation required to effect the maximum acceleration. In the case of unvulcanized latices, prolonging the duration of the agitation beyond the least period required to effect maximum acceleration produces no further effect. In the case of vulcanized latices, I have found that there is an optimum duration of agitation, which varies according to the severity of the agitation to which the vulcanized latex may be subjected, and that prolonging the agitation beyond the optimum period results in a diminished rate of creaming as compared with the rate resulting from agitation for the optimum period.

In addition to increasing the rate of creaming of the latex, the new process also results in a substantial diminution of the usual induction period wherein substantially no creaming takes place, and under the optimum conditions the induction period may be substantially entirely eliminated so that the rubber-rich and serum portions begin to separate immediately.

A further advantageous result of the new process is that the total time required to produce a latex cream of any desired solids content is greatly reduced as compared with the time required in the usual chemical creaming processes. The saving in time results not only from the lessening or elimination of the induction period, but also from the more rapid rate of creaming in comparison with the rate which obtains in the usual processes following the induction period.

In order that the novel results of the present invention may be fully appreciated but without intention to limit the invention except as required by the prior art, the results of a number of examples will be included. In these examples a rapid stirring device, having three triangular blades about one-half inch in radial length and slightly pitched from the plane of rotation, was used to stir about 50 cc. of latex, with or without creaming agent, as desired, in a square bottle of about 100 cc. capacity. The data in the case of vulcanized latex as well as of unvulcanized latex have been tabulated in such form as to provide a comparison of the volumes of serum obtained after definite time intervals, respectively, from the treated latex samples and from the samples in which the usual practice as known to the art has been followed.

*Example 1.*—The latex employed had been previously purified by creaming, and had then been vulcanized in liquid form by incorporating therein 3 parts of sulfur, 0.5 part of zinc oxide, and 1 part of zinc dimethyldithiocarbamate (parts per 100 of latex solids) and heating for one hour at 90° C. The resulting vulcanized latex was treated with .2 part of ammonium alginate per 100 parts of latex solids, to serve as creaming agent, and portions of the latex were then stirred at 13,000 R. P. M. for various time intervals as indicated in Table I.

*Table I*

| Time of agitation (seconds) | Vulcanized latex (32% solids), speed of stirrer 13,000 R. P. M. | | | | |
|---|---|---|---|---|---|
| | Percent serum formed after: Hours | | | | |
| | 10 | 20 | 30 | 50 | 70 |
| 0 | 1.0 | 4 | 10 | 16 | 19 |
| 30 | 21.0 | 29.5 | 35 | 37 | 38.5 |
| 60 | 12.5 | 25.0 | 30 | 34 | 36.0 |
| 120 | 8.5 | 20.0 | 23.5 | 26 | 29.0 |
| 180 | 2.0 | 6.0 | 10 | 16 | 18 |

It can be seen that 30 seconds' agitation gives a remarkable increase in the rate of creaming. It can also be seen that, as the time of stirring is prolonged beyond 30 seconds, the amount of serum formed in a given time decreases. The optimum time of stirring under the conditions of this example as shown is on the order of 30 seconds, or at most is substantially less than 60 seconds.

*Example 2.*—A once-creamed latex containing one part of piperidine pentamethylene dithiocarbamate, 0.5 part zinc oxide, and 3 parts of sulfur per 100 parts of rubber solids, was cured by heating for one hour at a temperature of 90° C. The resulting vulcanized latex was treated with .21 part of ammonium alginate, and portions of the latex were then stirred at 13,000 R. P. M. for various time intervals, with the results shown in Table II.

*Table II*

| Time of agitation (seconds) | Vulcanized latex (32% solids), speed of stirrer 13,000 R. P. M. | | |
|---|---|---|---|
| | Percent serum formed after: Hours | | |
| | 16 | 22 | 41 |
| 0 | 3.5 | 4.8 | 8.3 |
| 15 | 36 | 39 | 40 |
| 30 | 39 | 40 | 42 |
| 60 | 41 | 43 | 45 |

Here again is shown a great increase in the rate of creaming, brought about by brief periods of violent stirring at the time of the addition of the creaming agent.

*Example 3.*—In Table III similar results are given for a once-creamed latex vulcanized with 3 parts of sulfur, .5 part of zinc oxide, and 1 part of sodium dibutyl-dithiocarbamate. The vulcanized latex was treated with .21 part of ammonium alginate (per 100 parts of rubber solids). Then a portion of the thus treated latex was stirred at 13,000 R. P. M. for 30 seconds, and was then allowed to stand undisturbed, together with another portion which had not been stirred. A comparison of the volumes of serum formed after 96 hours with and without this stirring is shown in Table III.

*Table III*

| Time of agitation (seconds) | Vulcanized latex (32% solids), speed of stirrer 13,000 R. P. M. |
|---|---|
| | Percent serum formed after 96 hours |
| 0 | 3.5 |
| 30 | 33.0 |

The results given in Tables I to III were obtained from vulcanized rubber latices in which the initial rubber concentration at the time of creaming was 32%. The following example illustrates the application of the invention to the creaming of vulcanized latices of lower solids content, viz., 20%.

*Example 4.*—A sample of normal latex was vulcanized by incorporating therein 3 parts of sulfur, .5 part of zinc oxide and 1 part of zinc dimethyldithiocarbamate, and heating for one hour at 90° C. Then .25 part of ammonium alginate per 100 parts of rubber solids was added to the resulting vulcanized latex, and portions of the thus treated latex were stirred at 13,000 R. P. M. for various time intervals, with the results shown in Table IV.

*Table IV*

| Time of agitation (seconds) | Vulcanized latex (20% solids), speed of stirrer 13,000 R. P. M. | | |
|---|---|---|---|
| | Percent serum formed after: Hours | | |
| | 16 | 22 | 41 |
| 0 | 22 | 35 | 54 |
| 15 | 40 | 53 | 63 |
| 30 | 48 | 58 | 62 |
| 60 | 42 | 53 | 60 |

The optimum time of stirring under the conditions of this example lies around 30 seconds, as is clearly seen from the table.

*Example 5.*—As shown by this example, the invention may also be employed with creaming agents other than alginates. To a portion of the vulcanized latex of Example 1 was added .5 part of pectin per 100 parts of rubber solids. After the addition of the pectin, portions of the latex were stirred at 13,000 R. P. M. for various time intervals, with the results shown in Table V.

*Table V*

| Time of agitation (seconds) | Vulcanized latex (32% solids), speed of stirrer 13,000 R. P. M. Volume percent of serum after 27 hours |
|---|---|
| 0 | 6 |
| 15 | 34 |
| 30 | 32 |
| 60 | 28 |

It may be readily seen that 15 seconds' agitation under the conditions used increased the volume of serum separated after 27 hours by about 500%, while with longer agitation the increase was slightly less pronounced.

The agitation of the latex may be effected prior to instead of following the addition of the creaming agent with equally good results. In such case the change produced in the latex itself by the agitation, whatever the nature of the change may be, is fugitive, and rapidly disappears, the latex apparently reverting entirely to its original condition within less than three hours after the agitation, and thereafter showing no increase in the normal rate of creaming upon the addition of a creaming agent. Hence, when the agitation is carried out prior to the addition of the creaming agent, said addition should be made within substantially less than three hours following the period of agitation, and preferably within as short a time as possible. In general, then, it is preferred to carry out the agitation either a short time before or a short time after the addition of the creaming agent, or concurrently therewith.

Agitation of the latex prior to the addition of the creaming agent is clearly illustrated in Examples 6 and 7, Example 6 showing the effect on vulcanized latex, and Example 7 showing the effect on normal latex, of stirring at various time intervals prior to the addition of the creaming agent. The duration of the creaming periods is reckoned from the time at which the creaming agent is added.

*Example 6.*—In Table VI is shown the effect of agitating different portions of a vulcanized latex at two different intervals prior to the addition of .21 part ammonium alginate per 100 parts of latex solids as the creaming agent.

The vulcanized latex was prepared by incorporating in normal latex 3 parts of sulfur, .5 part of zinc oxide, and 1 part of zinc dimethyldithiocarbamate and heating the mixture for 90 min. at 90° C.

*Table VI*

| Effect of violent agitation prior to the introduction of creaming agent into a vulcanized latex | Vulcanized latex (32% solids), speed of stirrer 13,000 R. P. M. Percent volume of serum after: Hours | | |
|---|---|---|---|
| | 1 | 6 | 23 |
| No stirring | 0 | 0 | 4.7 |
| Stirred 15 secs. Creaming agt. added immediately | 3.8 | 15 | 31 |
| Stirred 15 secs. Creaming agt. added 3 hours later | 0 | 0 | 4.0 |

It is obvious that the potential accelerating effect of the agitation has been entirely lost by the 3 hours' delay in adding the creaming agent.

*Example 7.*—Table VII shows the effect, upon a normal ammonia-preserved latex (unvulcanized), of agitating at two different time intervals prior to the addition thereto of 0.21% of ammonium alginate (based on the solids content of the latex) as creaming agent.

*Table VII*

| | Normal latex (32 percent solids), speed of stirrer 13,000 R. P. M. Percent volume of serum after: Hours | | | |
|---|---|---|---|---|
| | 1 | 3 | 5 | 20 |
| No stirring | 1.0 | 5 | 34 | 48 |
| Stirred 30 secs. just before adding creaming agent | 26 | 50 | 55 | 59 |
| Stirred 30 secs., 3 hrs. before adding creaming agent | 4 | 20 | 37 | 50 |

*Example 8.*—The rapid falling off of the creaming rate, as the addition of the creaming agent is delayed for increasing periods of time following the agitation, is still more clearly shown in a series of runs, wherein the addition of the creaming agent was delayed for 15, 45 and 75 minutes, respectively. The latex employed was normal ammonia-preserved latex of 32.5% solids content. The creaming agent was 0.2% of ammonium alginate (based on the solids content of the latex). The agitation in each case was for 15 sec. at a stirrer speed of 13,000 R. P. M.

*Table VIII*

| Interval between stirring, and the addition of creaming agent | Volume percent of serum after creaming period (hours) | | | | | |
|---|---|---|---|---|---|---|
| | 1 | 2 | 3 | 4 | 5 | 6 |
| 0 | 4 | 8 | 15.5 | 23 | 32.5 | 40.5 |
| 15 minutes | 2 | 6 | 11 | 17.5 | 26 | 34 |
| 45 minutes | 0 | 2 | 4 | 8.5 | 15 | 21.5 |
| 75 minutes | 0 | 0 | 1.5 | 6 | 12 | 19 |
| No stirring | 0 | 0 | 0.5 | 2 | 5 | 10.5 |

The creaming period in each run is reckoned from the time at which the creaming agent was added. With the volumes of serum formed after a creaming period of 6 hours as the basis of comparison, it is seen that the optimum acceleration of the creaming rate is obtained when there is no delay in adding the creaming agent after the agitation, whereas the benefit of the agitation is lost to the extent of about 22% by a delay of 15 minutes, of about 63% by a delay of 45 minutes, and of about 72% by a delay of 75 minutes. Obviously, if the creaming agent is to be added subsequently to the violent agitation, the intervening period should be as short as possible, preferably not exceeding a very few minutes. For obvious and practical reasons, however, it is preferred to add the creaming agent to the latex either prior to or concurrently with the violent agitation of the latex.

From Examples 6, 7 and 8 it is clear that the increased rate of creaming which may be effected by the process of the invention, in the case of both vulcanized and unvulcanized latices, does not depend on the presence of the creaming agent in the latex at the time the latex is subjected to the violent agitation. Tables VI and VII, and more particularly Table VIII, also show clearly the preliminary induction period wherein no useful degree of creaming takes place after the addition of the creaming agent in the usual creaming processes, that is where the creaming agent is merely stirred into the latex, and also shows that by virtue of the process of the present invention this non-creaming induction period is substantially reduced or eliminated.

The following examples illustrate the effect of varying speeds of agitation on the rate of creaming of normal latex.

*Example 9.*—Portions of normal latex are agitated for 30 seconds at various speeds ranging from 13,000 down to 500 R. P. M., following the addition of 0.2% of ammonium alginate (based on the solids content) to each portion. As a control another portion is shown which has received no agitation other than the relatively slow stirring necessary to mix the creaming agent with the latex as in standard practice. The results are shown in Table IX.

*Table IX*

| Rate of stirring | Effect of rate of agitation for constant time normal latex (32% solids) time of stirring 30 seconds | | | | |
|---|---|---|---|---|---|
| | Percent volume of serum after: Hours | | | | |
| | 1 | 2 | 3 | 5 | 23 |
| (R. P. M.) | | | | | |
| 13000 | 17 | 37 | 45 | 49 | 52.5 |
| 11000 | 17 | 35 | 46 | 49 | 55 |
| 7000 | 18 | 37 | 45 | 49 | 53.5 |
| 4800 | 16.5 | 35 | 44 | 49 | 53.5 |
| 1600 | 1.0 | 2 | 9 | 36 | 50.0 |
| 500 | 0.0 | 1.5 | 2 | 21 | 49.0 |
| No stirring | 0.5 | 1.0 | 7 | 35 | 48.0 |

It may be noticed that under the conditions of this example there are only very small differences in the rates of creaming when stirring speeds from 13000 to 4800 R. P. M. are utilized. When lower speeds were used, for example 1600 R. P. M., the creaming rate was only slightly higher than the creaming rate of latex which has not been agitated at all. With a stirring speed of only 500 R. P. M., it can readily be seen that the creaming rate was no higher than that resulting from the usual practice where no agitation is used.

In Example 9 above it was found that stirring for 30 seconds at 1600 R. P. M. resulted in very little increase in the rate of creaming as compared with the case where no agitation was used. In the following example it is shown that if longer stirring periods are employed at this speed of agitation, increase in the creaming rate may be obtained.

*Example 10.*—The latex employed was the same as that of Example 9, using the same creaming agent, but the agitation being effected at a constant stirrer speed of 1600 R. P. M. for various intervals of time, with the results shown in Table X.

*Table X*

| Time of stirring (seconds) | Effect of time of stirring at 1600 R. P. M. normal latex (32% solids) | | | | |
|---|---|---|---|---|---|
| | Percent volume of serum after: Hours | | | | |
| | 1 | 2 | 3 | 5 | 20 |
| No stirring | 0 | 3 | 8 | 33 | 48 |
| 15 | 0 | 1 | 8 | 36 | 49 |
| 30 | 0 | 2 | 6 | 32 | 49.5 |
| 60 | .5 | 6 | 20 | 41 | 51 |
| 120 | 9 | 23 | 36 | 44 | 51 |

It is thus seen that stirring at 1600 R. P. M. for 120 seconds definitely increased the rate of creaming, while up to 30 seconds of stirring had substantially no effect on the creaming rate.

*Example 11.*—The effect of varying periods of agitation on the creaming rate when normal latex, to which has been added .22 part of ammonium alginate per 100 parts of rubber solids, is stirred at 3900 R. P. M., is shown in Table XI.

*Table XI*

| Time of stirring (seconds) | Effect of time of stirring at 3,900 R. P. M. normal latex (32% solids) | | | | |
|---|---|---|---|---|---|
| | Percent volume of serum after: Hours | | | | |
| | 1 | 2 | 3 | 5 | 23 |
| No stirring | 0 | 1 | 1 | 10 | 33 |
| 15 | 15 | 33 | 40 | 43 | 48 |
| 30 | 20 | 38 | 41 | 44 | 48 |
| 60 | 20 | 37 | 41 | 45 | 48 |
| 120 | 20 | 35 | 40 | 42 | 47 |

It is seen here that there is a very substantial increase in the creaming rate as a result of agitation, with only slight differences between the rates for the various stirring periods employed.

*Example 12.*—This example illustrates the same principle as Examples 10 and 11, in this case the rate of stirring being 5400 R. P. M. To normal latex was added .2 part of ammonium alginate per 100 parts of rubber solids, and portions of the mixture were agitated at 5400 R. P. M. for various periods of time.

*Table XII*

| Time of stirring (seconds) | Effect of time of stirring at 5,400 R. P. M. normal latex 32% solids | | | | |
|---|---|---|---|---|---|
| | Percent volume of serum after: Hours | | | | |
| | 1 | 2 | 3 | 5 | 23 |
| No stirring | 0.5 | 4 | 14 | 38 | 51 |
| 15 | 13 | 25 | 38 | 47 | 52 |
| 30 | 15 | 30 | 43 | 47 | 54 |
| 60 | 12 | 25 | 38 | 39 | 54.5 |

Under the conditions of this example, 30 seconds appears to be the optimum stirring time.

In place of a batch process, wherein a fixed body of latex is agitated for the proper time, as shown in the above examples, a continuous process may be used. For example, the latex may be made to pass continuously through a receptacle or chamber provided with an inlet, an outlet, and means for rapidly agitating the stream of latex as it passes through the chamber. In this manner large bodies of latex may be treated with minimum requirements for machinery and space, and in such a continuous process a small agitating machine is capable of treating a very large volume of latex per day. The creaming agent in such a continuous process, as well as in the discontinuous process, may be added before, during, or after the agitating operation. An example of such a continuous process is hereinafter described.

In the production of creamed latex it is usually very important to produce a cream having as high a rubber content as possible, both in order to reduce transportation charges to a minimum, particularly when the creaming operation is carried out in a plantation country, and because of the requirements to be met in the industrial applications of creamed latex. Thus, a small increase in the rubber content of a creamed latex, such as an increase of 2 to 8%, may represent substantial savings in shipping costs, and may be the margin between acceptance and rejection of a shipment of creamed latex for certain industrial uses. It has been found that the process of this invention makes possible the production of creamed latex of higher rubber content than has been obtainable by previous creaming processes, as well as a substantial reduction in the time required for the production of such creamed latex. The following example is illustrative:

*Example 13.*—A quantity of freshly tapped latex was diluted to a 36% solids content and was treated so as to contain 0.7% ammonia and 0.08% ammonium alginate, based on the water content. One portion of this batch was allowed to cream without further treatment, while other portions were subjected to severe agitation by causing them to flow through a receptacle at the rate of 131 c. c., 213 c. c., and 284 c. c., respectively, per minute, the receptacle having a capacity of 200 c. c. and being provided with stirring means similar to that employed in the previous examples. In Table XIII are shown the volumes of serum which had separated after 2, 4, and 6 days, expressed as percent of total volume of latex, together with the solids contents of the corresponding creams.

*Table XIII*

|  | Cream-ing period | Portion | | | |
|---|---|---|---|---|---|
|  |  | 1 | 2 | 3 | 4 |
| Rate of flow through stirrer (c. c. per min.) |  | 0 | 131 | 213 | 284 |
| Vol. of serum | 2 days | 38.5 | 44.8 | 44.4 | 43.9 |
|  | 4 days | 40.8 | 46.6 | 46.0 | 45.7 |
|  | 6 days | 42.5 | 47.9 | 47.2 | 46.8 |
| Solids content of cream | 2 days | 53.4 | 58.1 | 57.8 | 57.3 |
|  | 4 days | 55.1 | 59.7 | 59.2 | 58.8 |
|  | 6 days | 56.4 | 60.9 | 60.3 | 59.8 |

The data of this example disclose that both a greater separation of serum, and a more highly concentrated cream, may be produced in two days, by the method of the present invention, than can be produced in six days by the ordinary method. It is also seen that a cream of over 60% solids content is produced in six days by the new process, as compared with a cream of only 56.4% solids content by the ordinary method.

Examples along the lines of those above set forth might be multiplied, but it appears that the data given are sufficient to clearly establish that the rate of creaming by means of creaming agents may be greatly increased by severe agitation of the latex for a short period of time.

From the data presented it is clear that the violent agitation effects some change in the latex which is temporary and reversible, and which is effected irrespective of the presence or absence of the creaming agent during the period of agitation, and by virtue of which change the creaming agent is enabled to function immediately. It is equally clear that the results of the present invention are of a wholly different order from the results obtained by incorporating a creaming agent into latex in the usual manner without subjecting the latex to violent agitation.

Although in performing the step of violent agitation upon the latex considerable aeration of the latex may occur, the process does not seem to be dependent upon the air thus introduced for its successful operation nor is it in any way impeded by the presence of such air, for the process is equally operative when carried out upon latex which has been deaerated prior to the violent agitation and/or subjected to vacuum during and/or following said agitation.

It is to be understood that the usual known methods for improving the rate of creaming by means of creaming agents may be employed together with the methods of the present invention to obtain further augmented rates of creaming. For example, latex which has been heated at various temperatures up to 90° C. or above, either by live steam or indirectly, and subjected to severe agitation according to the invention, exhibits a still further increased rate of creaming.

With the above detailed disclosure of the invention, it is evident that numerous modifications will suggest themselves to those skilled in the art, and it is not desired to limit the invention otherwise than as set forth in the appended claims.

Having thus described my invention, what I claim and desire to protect by Letters Patent is:

1. The method of increasing the rate of creaming of latex which comprises adding a creaming agent to the latex and subjecting the latex to violent shearing stress for a brief period of time, and thereafter allowing the latex to separate into rubber-rich and serum portions by gravity.

2. The method of increasing the rate of creaming of latex which comprises adding a creaming agent to the latex and subjecting the latex to violent agitation for a short period of time, and thereafter allowing the latex to separate into rubber-rich and serum portions by gravity.

3. The method of increasing the rate of creaming of vulcanized latex which comprises adding a creaming agent to the latex and subjecting the latex to violent agitation for a short period of time, and thereafter allowing the latex to separate into rubber-rich and serum portions by gravity.

4. The method of increasing the rate of creaming of latex which comprises adding a creaming agent to the latex and passing a continuous stream of the latex through a receptacle in which the latex is violently agitated for a short period of time, and thereafter allowing the latex to separate into rubber-rich and serum portions by gravity.

5. The method of increasing the rate of creaming of latex which comprises adding a creaming agent to the latex and stirring the latex rapidly for a short period of time, and thereafter allowing the latex to separate into rubber-rich and serum portions by gravity.

6. The method of increasing the rate of creaming of latex which comprises adding a creaming agent to the latex and subjecting the thus treated latex to violent mechanical agitation for a short period of time.

7. The method of increasing the rate of creaming of latex which comprises violently agitating the latex for a short period of time, then adding a creaming agent to the latex within a relatively short time after said agitation, and allowing the latex to separate into rubber-rich and serum portions by gravity.

8. The method of increasing the rate of creaming of latex which comprises adding a creaming agent to the latex, violently agitating the latex for a period of time sufficient to substantially reduce the normal non-creaming induction period, and allowing the latex to separate into rubber-rich and serum portions by gravity.

9. The method of increasing the rate of creaming of vulcanized latex comprising adding a creaming agent to said latex and subjecting the latex to a violent agitation equivalent to that effected by stirring a 50 cc. portion of said latex in a 100 cc. bottle for a length of time up to one minute by means of one inch diameter high-speed stirrer having three triangular blades running at 13,000 revolutions per minute.

10. The method of increasing the rate of creaming of normal latex comprising adding a creaming agent to said latex and subjecting the latex to a violent agitation equivalent to that effected by stirring a 50 c. c. portion of said latex in a 100 cc. bottle for a length of time up to two minutes by means of a one inch diameter high-speed stirrer having three triangular blades running at 3,900 revolutions per minute.

11. In the method of concentrating latex by a chemical creaming process, the step of subjecting the latex to violent agitation for a brief period of time shortly before allowing the latex to separate into rubber-rich and serum portions by gravity.

12. In the method of concentrating normal latex by a chemical creaming process, the step of subjecting the latex to violent agitation for a period of time up to two minutes shortly before allowing the latex to separate into rubber-rich and serum portions by gravity.

13. In the method of concentrating vulcanized latex by a chemical creaming process, the step of subjecting the latex to violent agitation for a period of time up to one minute shortly before allowing the latex to separate into rubber-rich and serum portions by gravity.

14. The method of increasing the rate of creaming of vulcanized latex comprising subjecting the latex to a violent agitation equivalent to that effected by stirring a 50 cc. portion of said latex in a 100 cc. bottle for a length of time up to one minute by means of one inch diameter high-speed stirrer having three triangular blades running at 13,000 revolutions per minute, and within three hours adding a creaming agent to the thus treated latex.

15. The method of increasing the rate of creaming of normal latex comprising subjecting the latex to a violent agitation equivalent to that effected by stirring a 50 cc. portion of said latex in a 100 cc. bottle for a length of time up to two minutes by means of a one inch diameter high-speed stirrer having three triangular blades running at 3,900 revolutions per minute, and adding a creaming agent within three hours to the thus treated latex.

JOHN McGAVACK.